United States Patent
Kojima et al.

(10) Patent No.: US 8,056,981 B2
(45) Date of Patent: Nov. 15, 2011

(54) SEAT APPARATUS

(75) Inventors: Kiyoyuki Kojima, Inuyama (JP); Akira Sakoguchi, Inuyama (JP)

(73) Assignee: Kabushiki Kaisha Imasen Denki Seisakusho, Inuyama-Shi (JP)

( * ) Notice: Subject to any disclaimer, the term of this patent is extended or adjusted under 35 U.S.C. 154(b) by 226 days.

(21) Appl. No.: 12/486,036

(22) Filed: Jun. 17, 2009

(65) Prior Publication Data

US 2009/0322137 A1 Dec. 31, 2009

(30) Foreign Application Priority Data

Jun. 18, 2008 (JP) ................. 2008-158994

(51) Int. Cl.
*B60N 2/20* (2006.01)
*B60N 2/22* (2006.01)
*B60N 2/225* (2006.01)

(52) U.S. Cl. ................................ 297/362.11

(58) Field of Classification Search .............. 297/326.11
See application file for complete search history.

(56) References Cited

U.S. PATENT DOCUMENTS

| 5,435,624 | A  | * | 7/1995  | Bray et al. | 297/362.11 |
|---|---|---|---|---|---|
| 6,193,316 | B1 | * | 2/2001  | Janke et al. | 297/362.11 |
| 7,118,178 | B2 | * | 10/2006 | Daniels | 297/362.11 X |
| 7,192,090 | B2 | * | 3/2007  | Sakamoto | 297/362.11 X |
| 7,500,719 | B2 | * | 3/2009  | Kojima | 297/362.11 X |
| 7,661,760 | B2 | * | 2/2010  | Nakaya et al. | 297/362.11 X |
| 7,726,742 | B2 | * | 6/2010  | Keyser et al. | 297/362.11 X |
| 7,775,594 | B2 | * | 8/2010  | Bruck et al. | 297/362.11 X |
| 2002/0089223 | A1 | * | 7/2002  | Yu | 297/362.11 |

FOREIGN PATENT DOCUMENTS

JP   2006-290334 A   6/2009

* cited by examiner

*Primary Examiner* — Rodney B White
(74) *Attorney, Agent, or Firm* — Oliff & Berridge, PLC

(57) ABSTRACT

A seat apparatus includes a reclining device and a power assist mechanism coupled to the reclining device through a coupling rod. The power assist mechanism includes a motor; a seat back-side bracket which is tiltably provided to move the seat back; an operational gear which is turnable depending on a rotational direction of the motor; a rod gear provided integrally with the coupling rod; and a lever gear having a gear part capable of being engaged with the rod gear and an engaging part capable of being engaged with the operational gear. The lever gear transmits the turning of the operational gear to the rod gear.

4 Claims, 10 Drawing Sheets

SEAT APPARATUS

BACKGROUND OF THE INVENTION

1. Field of the Invention

The present invention relates to a seat apparatus for use in a vehicle seat. More specifically, the invention relates to a seat apparatus which enables an operation of releasing a reclining lock of a seat back (back rest) and an operation of resetting (raising) the reclined seat back after the release of the reclining lock by remote control from a location away from the seat.

2. Description of the Related Art

With the spread of an electric power-assist vehicle seat, there have been provided various seat apparatuses which enable the operation of releasing the reclining lock of the seat back and the operation of raising the reclined seat back by remote control. For example, according to a seat actuator disclosed in Japanese Unexamined Patent Application Publication (JP-A) No. 2006-290334, the actuator is coupled to a reclining lock releasing lever (22) of the vehicle seat with a control cable (14) for the reclining lock releasing operation, and the actuator is couple to a seat back raising lever (21) of the vehicle seat with a control cable (15) for the seat back raising operation. The seat actuator includes a single motor (M), relay gears (2, 3) to which a rotational driving force of the motor is transmitted, and a first one-way clutch (4) and a second one-way clutch (8) to which rotations of the relay gears are transmitted.

The first one-way clutch (4) is operationally coupled to the control cable (14) for the reclining lock releasing operation through a first cam-crank mechanism. The second one-way clutch (8) is operationally coupled to the control cable (15) for the seat back raising operation through a second cam-crank mechanism. These two one-way clutches (4, 8) have conflicting power transmission characteristic with respect to rotation of the relay gear, and according to the rotational direction of the relay gears, only one of the two one-way clutches can transmit power to the corresponding cam-crank mechanism. That is, upon rotation of the motor (M) in the normal direction, only the first one-way clutch (4) is activated and the lever (22) is pulled through the control cable (14), thereby releasing the reclining lock. Upon rotation of the motor (M) in the reverse direction, on the contrary, only the second one-way clutch (8) is activated and the lever (21) is pulled through the control cable (15), thereby raising the seat back. As described above, the seat actuator disclosed in JP-A-2006-290334 can selectively perform the seat back reclining lock releasing operation and the seat back raising operation by use of one motor.

The technique disclosed in JP-A-2006-290334 attempts to reduce the seat actuator in size by combining the relay gears of relatively small diameter with the two one-way clutches. However, the use of a plurality of one-way clutches necessarily leads to complicated mechanical configuration and miniaturization of the actuator is limited. Moreover, since the seat back raising operation is performed through the control cable, a sufficiently strong motor is required and thus, miniaturization of such motor is difficult.

SUMMARY OF THE INVENTION

An object of the present invention is to provide a seat apparatus with relatively simple mechanical configuration (and electrical configuration) capable of releasing a reclining lock.

An aspect of the present invention relates to a seat apparatus including a reclining device which selectively achieves a locked state in which a seat back of a vehicle seat is locked at a selected tilt angle and a lock-free state in which the lock is released, and a power assist mechanism which is coupled to the reclining device through a coupling rod and performs an operation of releasing lock of the reclining device and a reset operation of resetting the seat back from a tilted state to a substantially upright state.

The power assist mechanism includes: a motor which is rotatable in a normal direction and a reverse direction; a seat back-side bracket which is tiltably provided to move the seat back; an operational gear which is operationally coupled to the motor and is turnable depending on a rotational direction of the motor; a rod gear which is provided integrally with the coupling rod to be turnable with the coupling rod; and a lever gear having a gear part capable of being engaged with the rod gear and an engaging part capable of being engaged with the operational gear, the lever gear being turnably provided to transmit the turning of the operational gear to the rod gear. The operational gear transmits power from the motor to the seat back-side bracket so as to tilt the seat back-side bracket in the direction of resetting the seat back from the tilted state to the substantially upright state based on the rotation of the motor in the normal direction. The lever gear and the rod gear cooperate to transmit power from the operational gear to the coupling rod so as to turn the coupling rod in the direction of releasing the locked state of the reclining device based on the turning of the operational gear in response to the rotation of the motor in the reverse direction.

It is preferable that the seat apparatus according to the present aspect further includes the following configuration.

Preferably, the operational gear is a sector gear having a small diameter part and a large diameter part, and one end of the large diameter part of the sector gear functions as a first pressing part which is capable of pressing the seat back-side bracket upon rotation of the motor in the normal direction, while the other end of the large diameter part of the sector gear functions as a second pressing part which is capable of pressing the engaging part of the lever gear upon rotation of the motor in the reverse direction.

Preferably, the seat apparatus further includes a control unit which controls the power assist mechanism. The control unit includes a lock releasing switch, a state detecting sensor for detecting whether the reclining device is in the locked state or the lock-free state, and an electronic control unit (ECU) electrically connected to the motor, the lock releasing switch and the state detecting sensor. When the lock releasing switch is operated under the condition that the reclining device is in the locked state, the electronic control unit rotates the motor in the reverse direction.

The seat apparatus according to the present aspect can reset the seat back from the tilted state to the substantially upright state based on the rotation of the motor in the normal direction, and can release the locked state of the reclining device based on the rotation of the motor in the reverse direction. That is, the operation of raising the seat back and the operation of releasing the reclining lock can be selectively performed by controlling the rotation of one motor. In addition, the configuration for utilizing the rotation of the motor in the reverse direction for the forced turning of the coupling rod in the direction of releasing the reclining lock can be formed of an extremely simple combination of three members: "the operational gear which is operationally coupled to the motor and is turnable depending on a rotational direction of the motor", "the rod gear turnably provided integrally with the coupling rod" and "the lever gear having a gear part capable of being engaged with the rod gear and an engaging part capable of being engaged with the operational gear, the lever gear being turnably provided to transmit the turning of the operational gear to the rod gear". Therefore, according to the present aspect, the function of releasing the reclining lock can be ensured with simpler mechanical configuration than the conventional one.

Moreover, by adopting the sector gear as the operational gear, the number of parts of the seat apparatus can be reduced and the apparatus can be miniaturized without impairing mechanical durability of a power transmission system.

Furthermore, by adopting the control unit which rotates the motor in the reverse direction when the lock releasing switch is operated under the condition that the reclining device is in the locked state, assurance of security and improvement in controllability in remote control can be achieved.

DETAILED DESCRIPTION OF THE PREFERRED EMBODIMENT

One embodiment of the present invention will be described below with reference to FIGS. 1 to 10.

Figure 1:
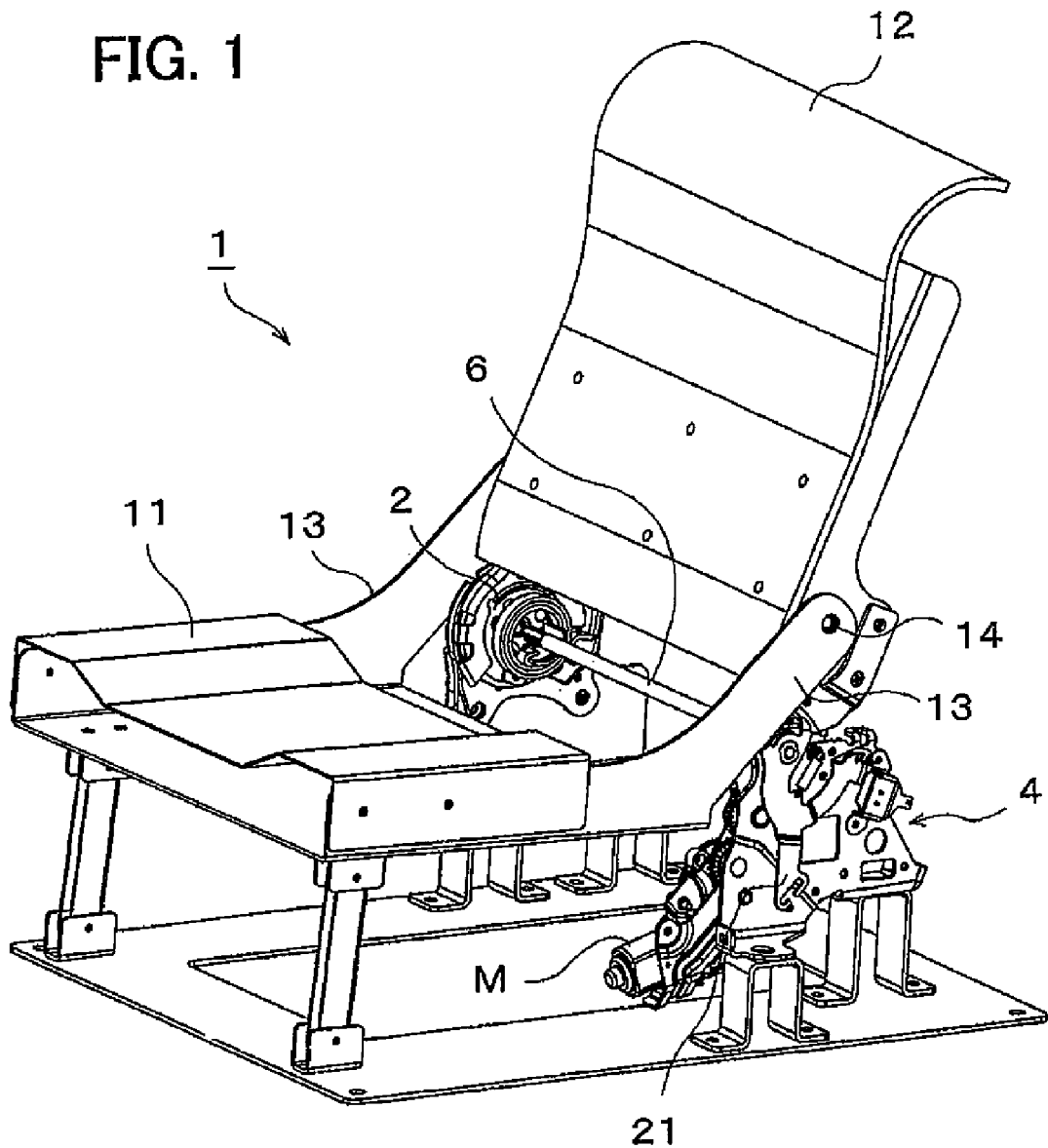
FIG. 1 is a schematic perspective view of a seat apparatus in accordance with one embodiment.

As shown in FIG. 1, a seat apparatus 1 of this embodiment includes a seat cushion frame 11 configuring a basic framework of a seat cushion and a tilt-adjustable seat back frame 12 configuring a basic framework of a seat back. The seat cushion frame 11 is rotatably coupled to the seat back frame 12 through a spindle 14 located at a front end (an upper end in this figure) of each of right and left coupling arms 13. The seat cushion frame 11 is movable in the longitudinal and vertical directions in connection with tilting of the seat back frame 12.

Figure 2:
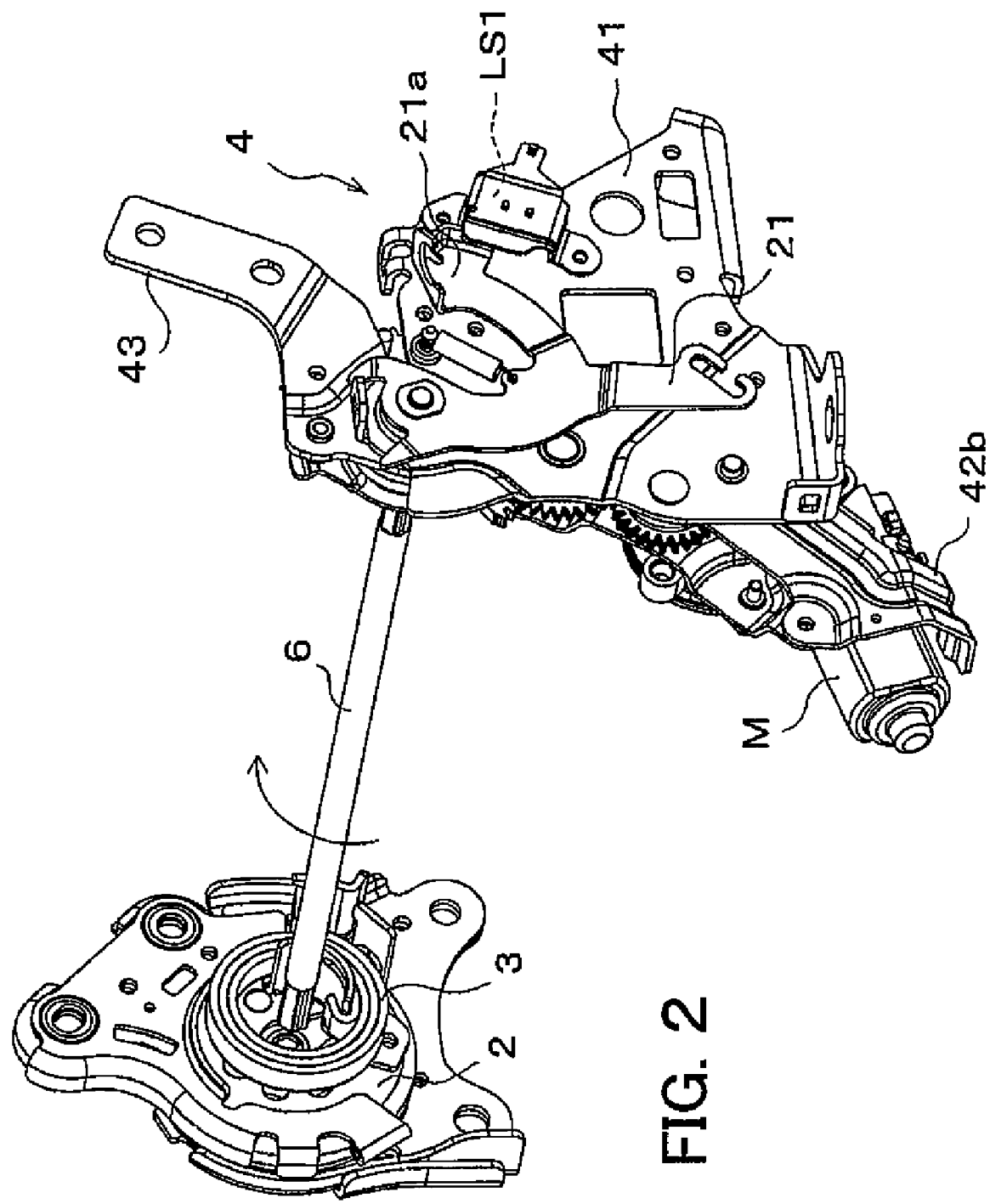
FIG. 2 is an enlarged perspective view of a main part of the seat apparatus in FIG. 1.
Figure 3:
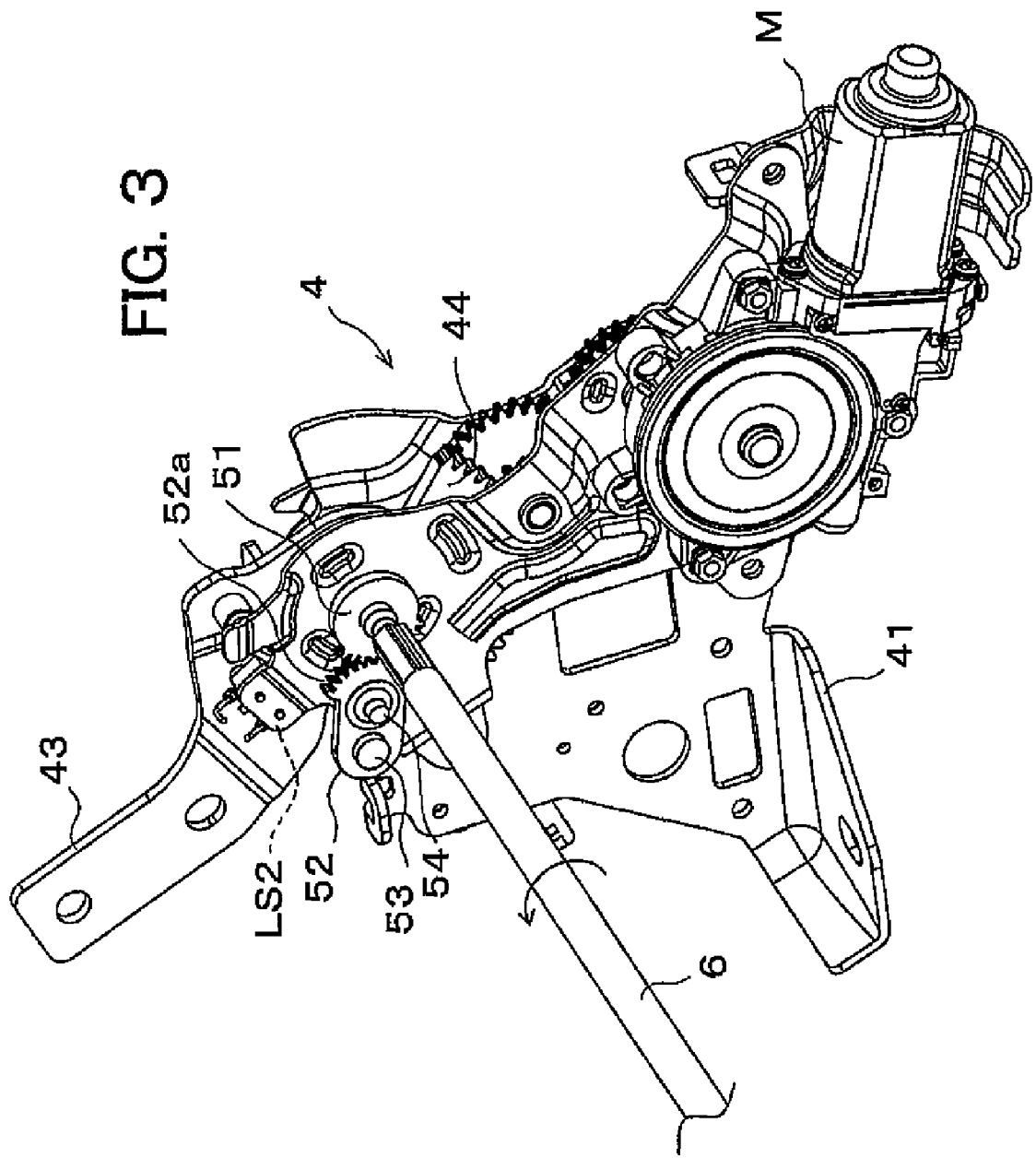
FIG. 3 is an enlarged perspective view of an inside of a power assist mechanism of the seat apparatus in FIG. 1.

As shown in FIGS. 1 to 3, the seat apparatus 1 further includes a reclining device 2 and a spiral spring 3 on its right side and a power assist mechanism 4 (lock releasing and resetting mechanism) and a free hinge on its left side. The reclining device 2 on the right side is operationally coupled to the power assist mechanism 4 on the left side through a coupling rod 6. The coupling rod 6 is forcibly turned by an operational lever 21 in a manual operation and by the power assist mechanism 4 in a switching operation, and the turning of the coupling rod 6 is transmitted to the reclining device 2.

The reclining device 2 is a common conventional reclining device capable of adjusting a tilt angle of the seat back frame 12 and reclining the seat back frame 12. More specifically, the reclining device 2 can adjust the tilt angle in multi stages based on the operation of the operational lever 21, put the seat back frame 12 into a lock-free state based on the operation of the operational lever 21, and rapidly tilt (forward tilt) the seat back frame 12 to a desired forward tilt angle in the lock-free state. In other words, the reclining device 2 of this embodiment "selectively achieves the locked state in which the seat back of the vehicle seat is locked at a selected tilt angle and a lock-free state in which the lock is released".

The spiral spring 3 provided near the reclining device 2 biases the seat back frame 12 to tilt forward at all times. For this reason, when the reclining device 2 is unlocked to be put into the lock-free state, the seat back frame 12 is tilted forward by the biasing action of the spiral spring 3.

Figure 4:
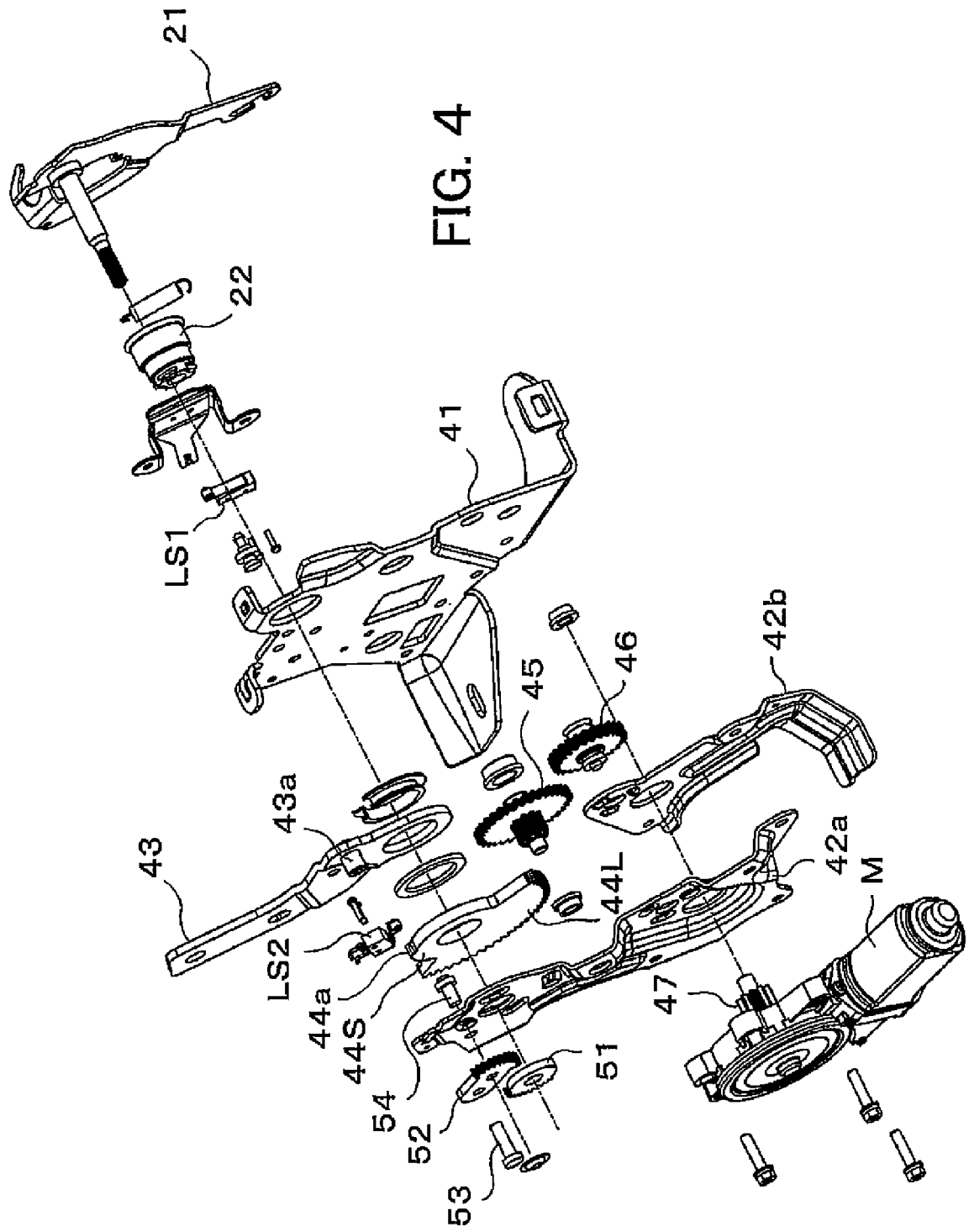
FIG. 4 is an exploded perspective view of the power assist mechanism.

The power assist mechanism 4 operationally coupled to the reclining device 2 through the coupling rod 6 is provided as an actuator unit for releasing the lock of the reclining device 2 and resetting the seat back frame 12 from the tilted state to the substantially upright state according to remote control of a passenger. As shown in FIG. 4, the power assist mechanism 4 is configured of a supporting bracket 41 on its left side, two piece supporting brackets (42a, 42b) on its right side, a seat back-side bracket 43, a sector gear 44 as an operational gear, an operational lever 21, a motor M and the other members.

A group of the supporting brackets 41, 42a and 42b is fixedly attached to a floor surface of a car body. The seat back-side bracket 43 is a holding member for attaching and holding the seat back frame 12 and is turnably attached to the supporting brackets 41 and 42a around a bearing 22. A tilt angle of the seat back-side bracket 43 is determined by the seat back frame 12 as well as the reclining device 2. The seat back-side bracket 43 has an engaging protrusion 43a on the side facing the sector gear 44. The engaging protrusion 43a is pressed onto an end of a large diameter part 44L of the sector gear 44, thereby transmitting a rotational power of the sector gear 44 to the bracket 43.

The operational lever 21 and the sector gear 44 are rotatably supported by the supporting brackets 41 and 42a through the bearing 22. The sector gear 44 is operationally coupled to the motor M through a power transmission mechanism comprised of a plurality of gears (45, 46 and 47).

The motor M is a power source for the power assist mechanism 4, and a pulse motor with a reducer is adopted as the motor M in this embodiment. The motor M is activated in response to the operation of switches (refer to FIG. 5) by a passenger. An output shaft of the motor M is rotated in the normal or reverse direction according to a drive control signal emitted from an electronic control unit (ECU).

Figure 6:
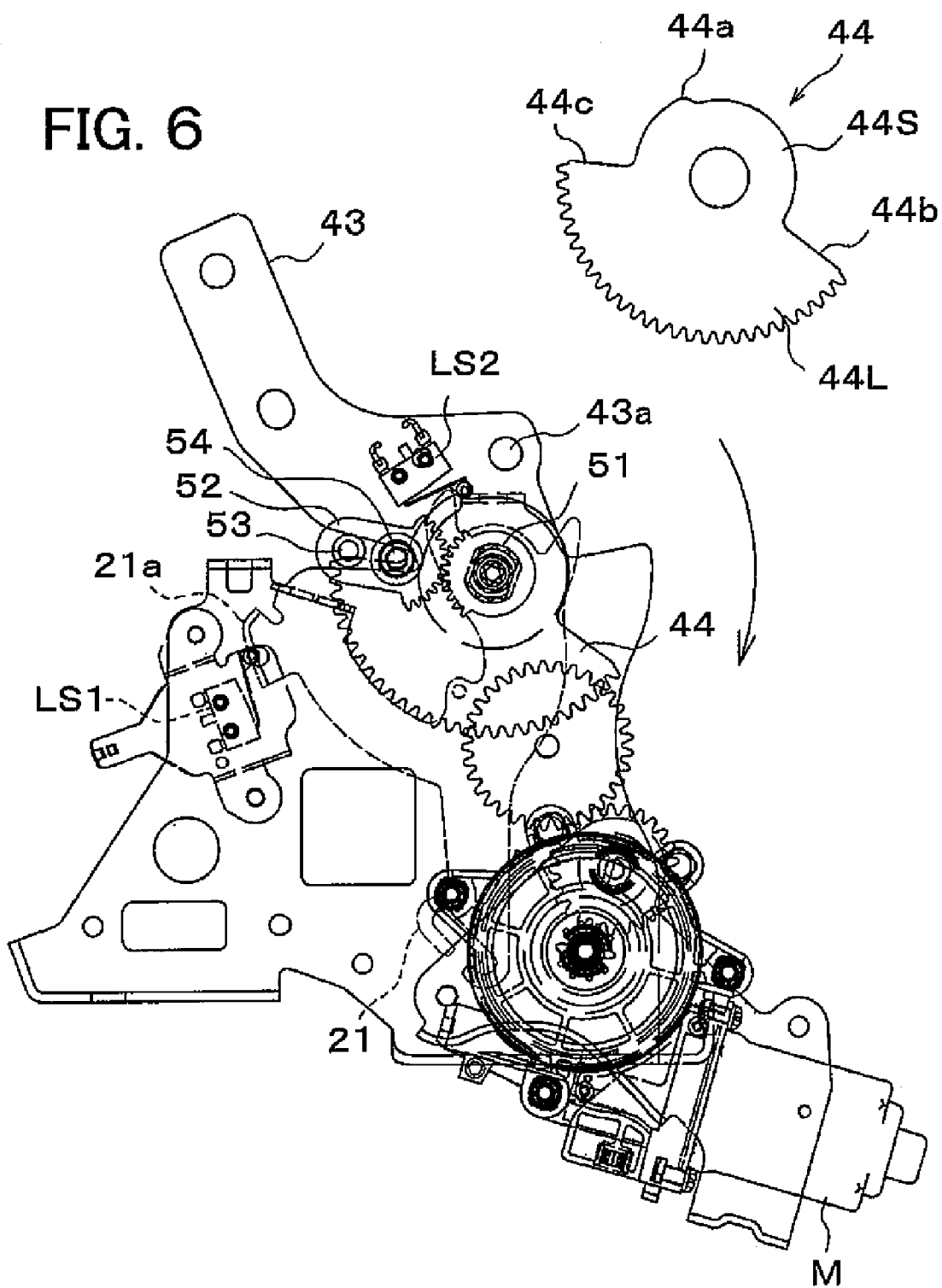
FIG. 6 is a view for explaining action of the power assist mechanism when viewed from an inside of the seat apparatus.

As shown in FIG. 4, the sector gear 44 as the operational gear is substantially fan-shaped and has the large diameter part 44L and a small diameter part 44S. A part of the small diameter part 44S is provided with a protruding step 44a and a stop switch LS2 can contact the protruding step 44a. Moreover, as shown in an upper space in FIG. 6, the large diameter part 44L of the sector gear 44 has two ends 44b and 44c on a boundary with the small diameter part 44S. Incidentally, the front end 44b in the travelling direction at the time when the sector gear 44 in FIG. 6 is rotated in the anticlockwise direction functions as a first pressing part capable of pressing the engaging protrusion 43a of the seat back-side bracket 43 upon rotation of the motor M in the normal direction. On the other hand, the rear end 44c in the travelling direction at the time when the sector gear 44 in FIG. 6 is rotated in the anticlockwise direction functions as a second pressing part capable of pressing an engaging pin 53 of a lever gear 52 described later upon rotation of the motor M in the reverse direction.

In this embodiment, the "normal direction" means a rotational direction of the output shaft of the motor in the case where the sector gear 44 operationally coupled to the motor M rotates so as to raise the tilted seat back frame 12. The "reverse direction" means a rotational direction of the output shaft of the motor in the case where the sector gear 44 rotates in the direction reverse to the normal direction.

As shown in FIGS. 3 and 4, the stop switch LS2 is attached to the vicinity of an upper end of the right supporting bracket 42. The stop switch LS2 is arranged so that the protruding step 44a of the sector gear 44 driven by the motor M may contact thereagainst. More specifically, the stop switch LS2 is positioned so as to be turned on by the protruding step 44a when a rotational phase of the sector gear 44 returns to a stand-by position before the seat back resetting operation.

As shown in FIGS. 2 and 4, a state detecting switch LS1 as a state detecting sensor is attached to the side of an outer surface of the left supporting bracket 41. The state detecting switch LS1 is arranged so that a branch end 21a of the operational lever 21 may contact thereagainst. More specifically, the state detecting switch LS1 is positioned so as to be turned on by the branch end 21a when a rotational phase of the operational lever 21 corresponds to the locked state of the reclining device 2. Therefore, the state detecting switch LS1 acts as the "state detecting sensor for detecting whether the reclining device 2 is in the locked state or the lock-free state".

As shown in FIGS. 3 and 4, at an end of the coupling rod 6 on the side of the power assist mechanism 4, a rod gear 51 is turnably provided integrally with the rod 6. On the side of an inner surface of the upper end of the right supporting bracket 42a, the lever gear 52 is supported so as to be turnable or swigable around a spindle 54. The lever gear 52 includes a gear part 52a capable of being engaged with the rod gear 51 and an engaging pin 53 as an engaging part capable of being engaged with the sector gear 44. When the engaging pin 53 is pressed by the sector gear 44 in a predetermined direction, the lever gear 52 transmits a turning driving force of the sector gear 44 to the rod gear 51, thereby forcibly turning the coupling rod 6.

Figure 5:
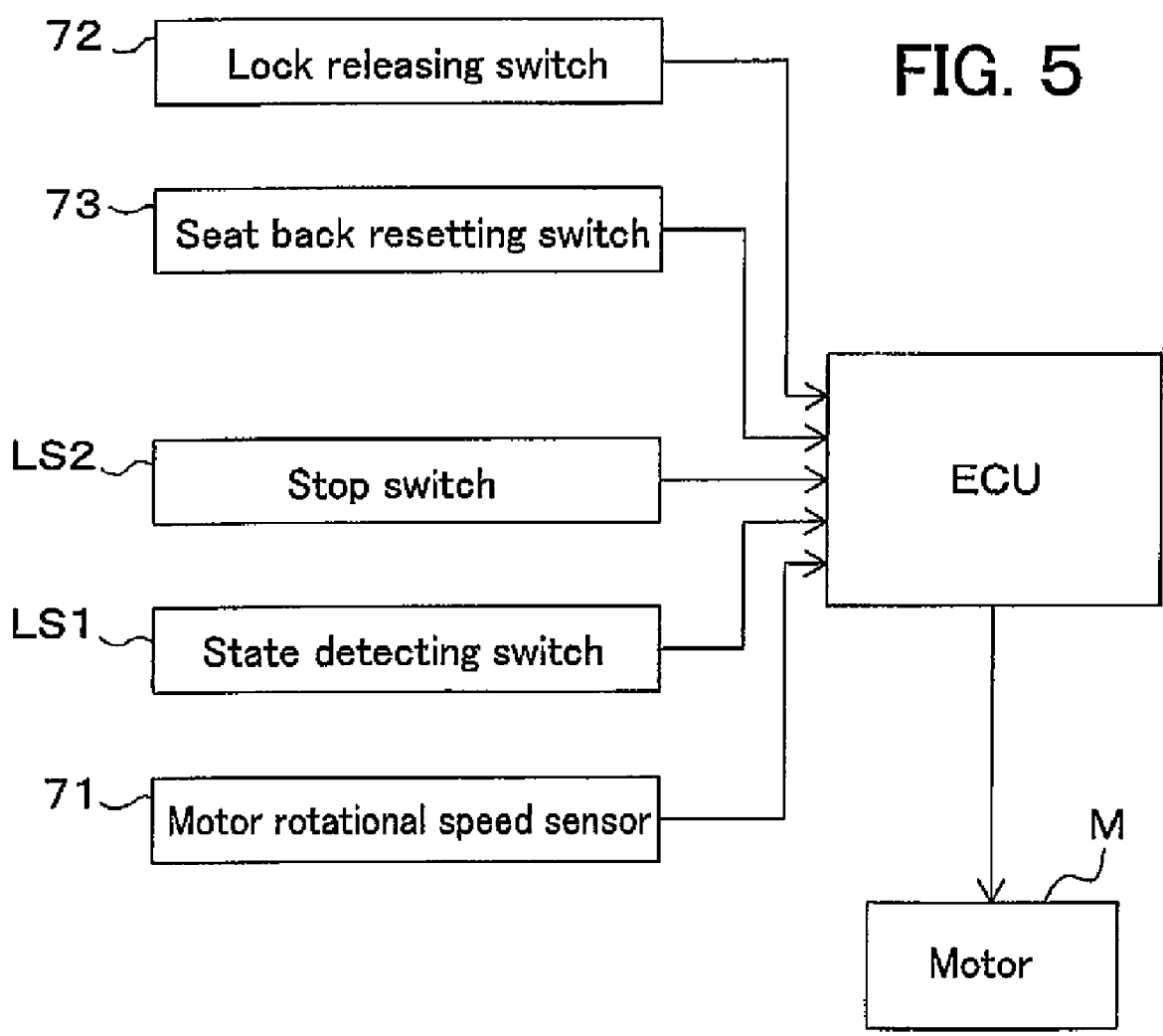
FIG. 5 is a schematic diagram of control configuration of the seat apparatus.

As shown in FIG. 5, the seat apparatus 1 includes electrical configuration as a unit for controlling the power assist mechanism 4. That is, the seat apparatus 1 includes a computer-like electronic control unit (ECU) which has a CPU, a ROM and a RAM therein. The motor M is connected to an output's side of the ECU. Meanwhile, the stop switch LS2, the state detecting switch LS1, a motor rotational speed sensor 71, a lock releasing switch 72 and a seat back resetting switch 73 are connected to an input's side of the ECU.

The motor rotational speed sensor 71 is a sensor for detecting the rotational direction and the rotational speed (the number of steps of pulse driving) of the motor M. The lock releasing switch 72 is a manual switch provided, for example, in the vicinity of a driver's seat and is operated when the passenger intends to release the locked state of the reclining device 2 by remote control to tilt the seat back forward. The seat back resetting switch 73 is a manual switch provided, for example, in the vicinity of a driver's seat and is operated when the passenger intends to reset the forward tilted seat back to the original substantially upright state by remote control. Referring to information sent from these switches or sensors (LS1, LS2, 71 to 73), the ECU controls activation and stoppage of the motor M according to a control program stored in the ROM.

Figure 7:
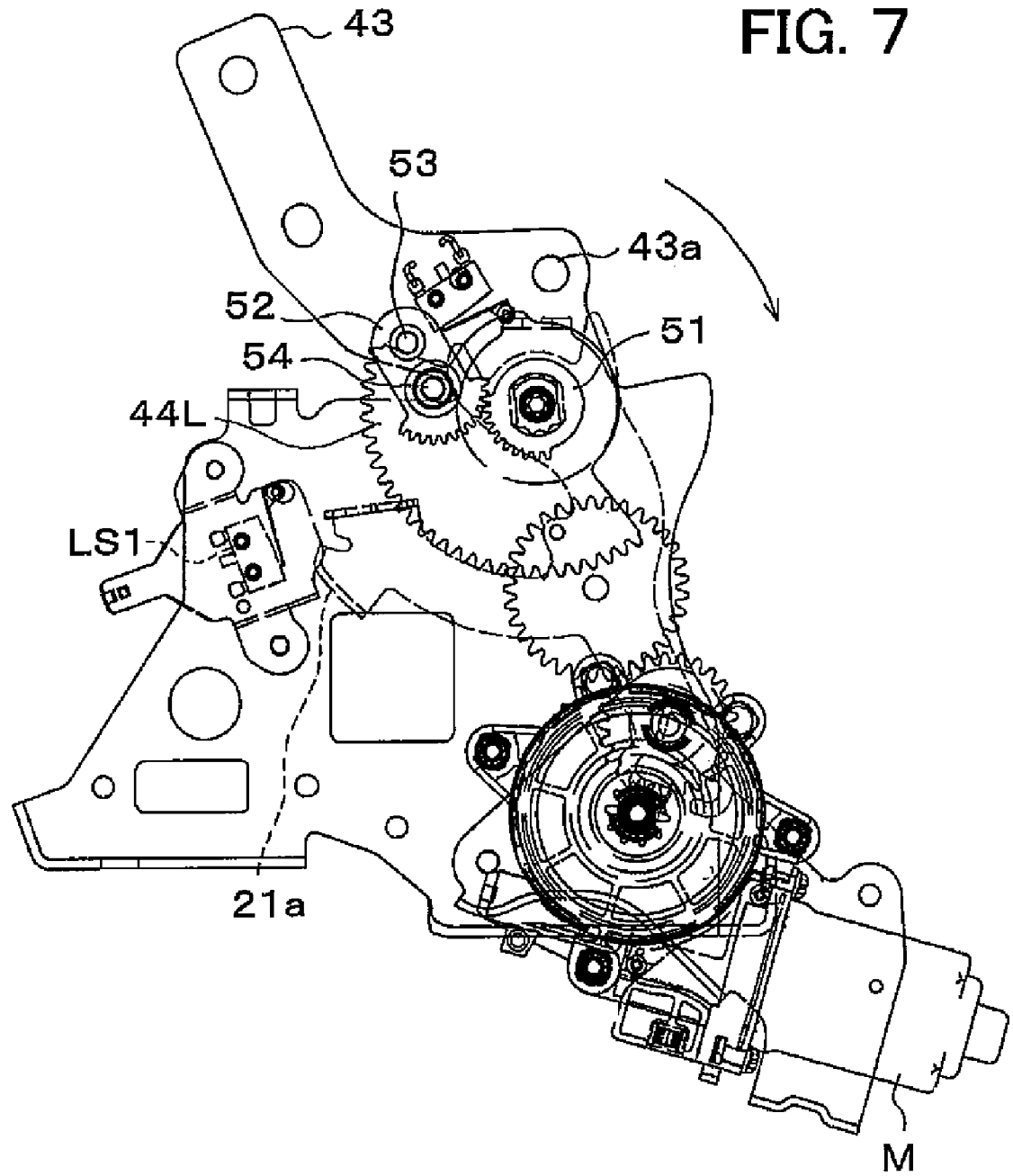
FIG. 7 is a view for explaining action of the power assist mechanism when viewed from the inside of the seat apparatus.

The operation of releasing lock of the reclining device 2 will be described below with reference to FIGS. 6 to 8.

FIG. 6 shows a stand-by state in which the seat back frame 12 is held and locked at a predetermined tilt angle by the reclining device 2. In this stand-by state, the operational lever 21 (represented by a broken line) and the seat back-side bracket 43 assume the positions shown in FIG. 6 and the sector gear 44 is disposed at a stand-by position (rotational phase at stand-by) shown in FIG. 6. In this state, the branch end 21a of the operational lever 21 contacts the state detecting switch LS1, so that the switch LS1 is turned on. That is, the state detecting switch LS1 outputs to the ECU a signal indicating that the reclining device 2 is in the locked state.

When the passenger operates the lock releasing switch 72 in the stand-by state in FIG. 6, a signal indicating the operation is input to the ECU and the ECU starts processing according to the control program. In this processing, the ECU determines whether or not the state detecting switch LS1 is in the ON state (that is, whether or not the reclining device 2 is in the locked state) at a timing when the lock releasing switch 72 is operated. Then, if the following two conditions: "there is an input from the lock releasing switch 72" and "the state detecting switch LS1 is turned on" are satisfied concurrently, the ECU activates the motor M so that the output shaft of the motor M starts to rotate in the reverse direction.

With the rotation of the motor M in the reverse direction, the sector gear 44 turns (follows) in the clockwise direction. Then, as in change from FIGS. 6 to 7, the end 44c of the large diameter part 44L of the sector gear 44 contacts the engaging pin 53 (the engaging part of the lever gear 52) and presses the engaging pin 53 so as to raise the engaging pin 53 upward from below. With pressing and raising of the engaging pin 53 by the large diameter part 44L of the sector gear 44, the lever gear 52 is forcibly turned around the spindle 54 in the clockwise direction, and based on the engagement relationship between the gear part 52a of the lever gear 52 and the rod gear 51, the rod gear 51 is forcibly turned in the anticlockwise direction. Such forced turning of the rod gear 51 causes turning of the coupling rod 6 integrated with the rod gear 51 in the lock releasing direction (refer to FIG. 3), resulting in that the lock of the reclining device 2 is released.

Upon detecting that the motor M has reversely rotated at a predetermined rotational amount since start of the reverse rotation on the basis of the signal sent from the motor rotational speed sensor 71, the ECU stops the reverse rotation of the motor M, in turn, the rotation of the sector gear 44 in the clockwise direction. After the stoppage, the ECU reversely rotates the sector gear 44 by the above-mentioned turning amount in the clockwise direction to return the sector gear 44 to the original position.

As soon as the reclining device 2 is unlocked to be put into the lock-free state, the seat back frame 12 is tilted forward to the most forward tilted position at one stroke by the biasing force of the spiral spring 3. In this connection, the seat back-side bracket 42 is also tilted forward to the most forward tilted position shown in FIG. 8. FIG. 8 shows the state in which the reclining device 2 is in the lock-free state and the seat back frame 12 is disposed at the most forward tilted position. At this time, the branch end 21a of the operational lever 21 is not in contact with the state detecting switch LS1 and the state detecting switch LS1 is put into the OFF state. Therefore, even if the passenger operates the lock releasing switch 72 in the condition shown in FIG. 8, the ECU does not activate the motor M.

Figure 9:
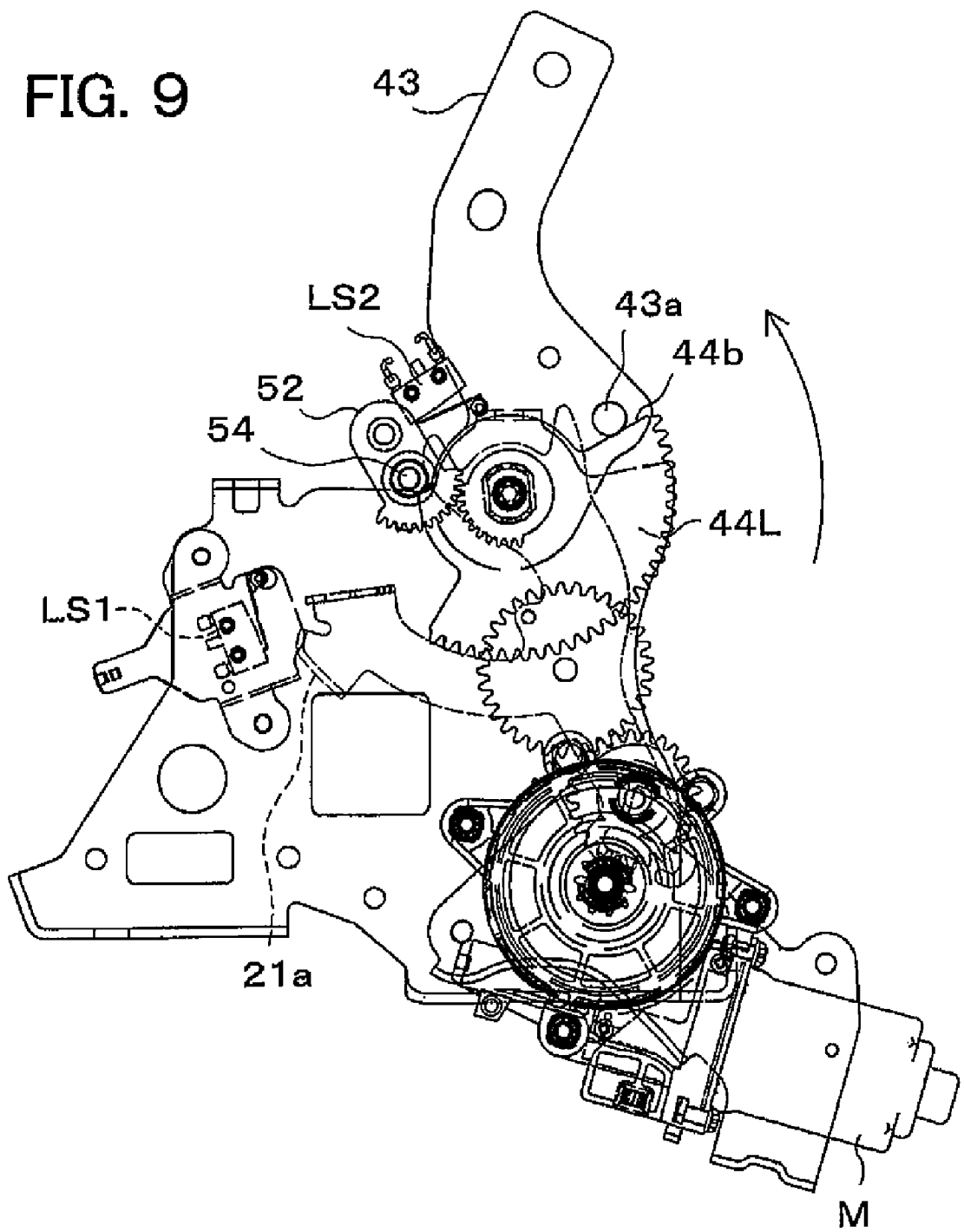
FIG. 9 is a view for explaining action of the power assist mechanism when viewed from the inside of the seat apparatus.
Figure 10:
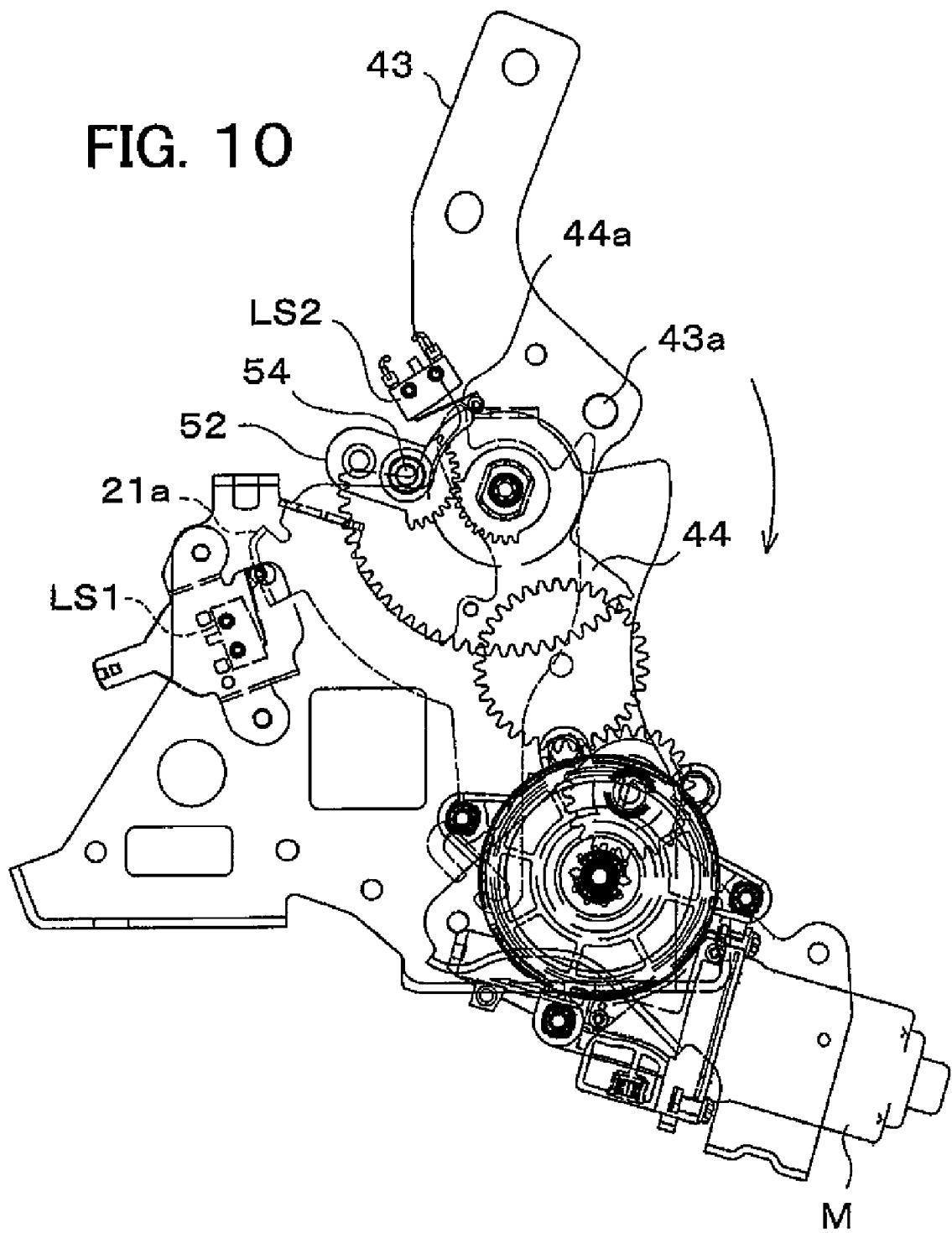
FIG. 10 is a view for explaining action of the power assist mechanism when viewed from the inside of the seat apparatus.

The operation of resetting the most forward tilted seat back frame 12 in the lock-free state to the locked state by the reclining device 2 will be described below with reference to FIGS. 8 to 10.

Figure 8:
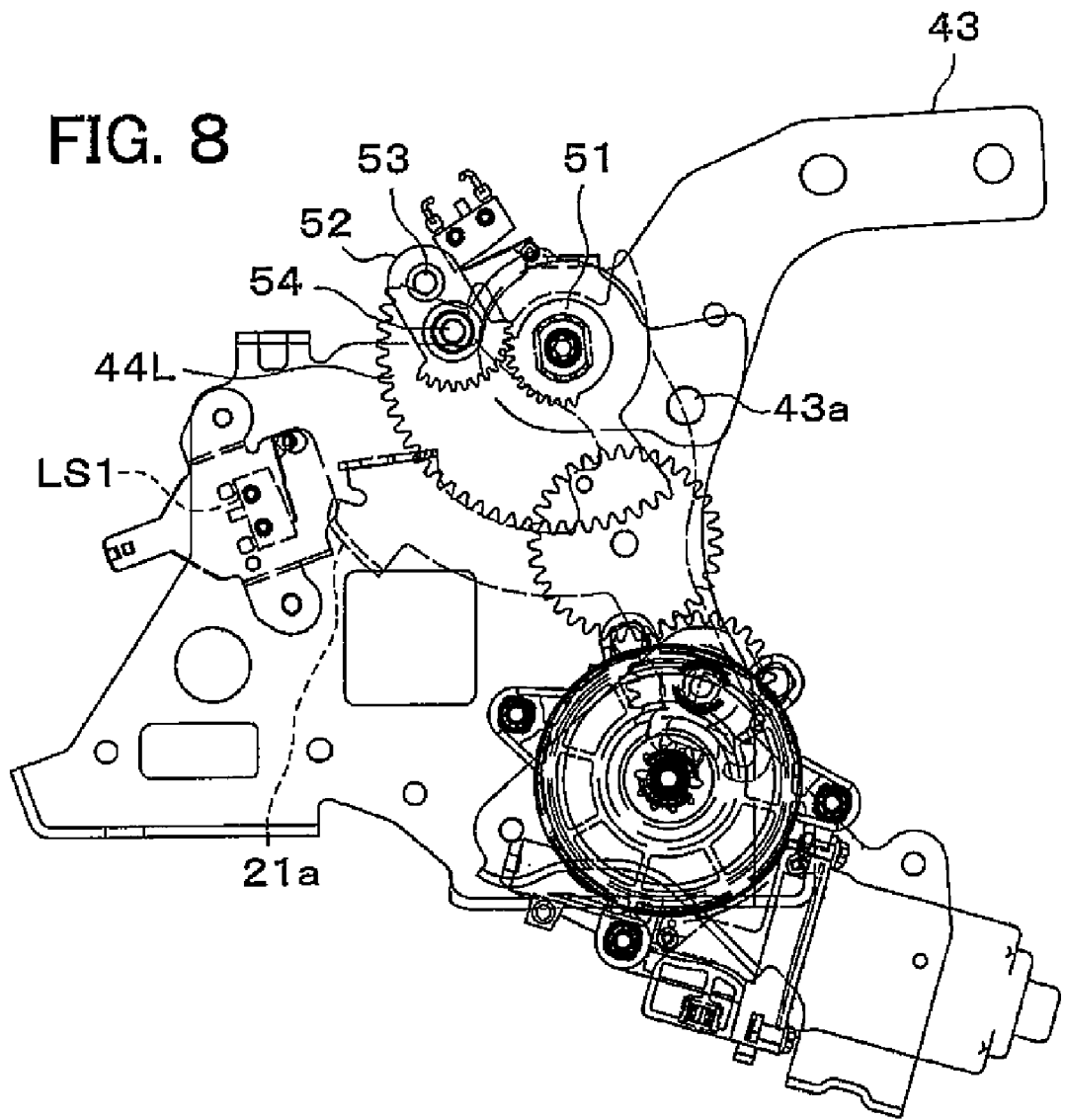
FIG. 8 is a view for explaining action of the power assist mechanism when viewed from the inside of the seat apparatus.

When the passenger operates the seat back resetting switch 73 in the state shown in FIG. 8, a signal indicating the operation is input to the ECU and the ECU starts processing according to the control program. In this processing, the ECU confirms (or determines) whether or not the state detecting switch LS1 is in the OFF state (that is, whether or not the reclining device 2 is in the lock-free state) at a timing when the seat back resetting switch 73 is operated. Then, after confirming that the state detecting switch LS1 is in the OFF state, the ECU activates the motor M so that the output shaft of the motor M starts to rotate in the normal direction.

With the rotation of the motor M in the normal direction, the sector gear 44 turns in the anticlockwise direction. Then, as in change from FIGS. 8 to 9 the end 44b of the large diameter part 44L of the sector gear 44 contacts the engaging protrusion 43a of the seat back-side bracket 43 and presses the engaging protrusion 43a so as to raise the engaging protrusion 43a from below. With raising and pressing of the engaging protrusion 43a by the large diameter part 44L of the sector gear 44, the seat back-side bracket 43 is forcibly turned in the anticlockwise direction. The forced turning of the bracket 43 causes raising (reset turning) of the seat back frame 12 coupled to the bracket 43, resulting in that the seat back frame 12 is returned to the locked position by the reclining device 2. FIG. 9 shows the position of the seat back-side bracket 43 corresponding to the initial locked position.

When the seat back-side bracket 43 returns to the predetermined locked position, the ECU stops the rotation of the motor M in the normal direction and then, rotates the motor M in the reverse direction. Then, the sector gear 44 turns from the position shown in FIG. 9 toward a stand-by position shown in FIG. 10 (which is the same as the stand-by position shown in FIG. 5) in the clockwise direction. When the sector gear 44 reaches the stand-by position shown in FIG. 10, the protruding step 44a of the small diameter part 44S of the sector gear 44 contacts the stop switch LS2. Upon receiving a signal from the stop switch LS2, the ECU stops the rotation of the motor M. In the state in FIG. 10, in which the sector gear 44 is located at the stand-by position, the branch end 21a of the operational lever 21 contacts the state detecting switch LS1 and the state detecting switch LS1 is put into the ON state (the state indicating that the reclining device 2 is in the locked state). Therefore, by operating the releasing switch 72 again, the passenger can forcibly release the lock of the reclining device 2 and tilt the seat back frame 12 forward to the most forward tilted position.

The seat apparatus 1 of this embodiment can reset the seat back frame 12 from the tilted state to the substantially upright state based on the rotation of the motor M in the normal direction and release the locked state of the reclining device 2 based on the rotation of the motor M in the reverse direction. That is, the operation of raising the seat back frame 12 and the operation of releasing the reclining lock can be selectively performed by controlling the rotation of the one motor M.

In this embodiment, the mechanical configuration for utilizing the rotation of the motor M in the reverse direction for the forced turning of the coupling rod 6 in the direction of releasing the reclining lock can be formed of an extremely simple combination of three members: the sector gear 44 as the operational gear, the rod gear 51 and the lever gear 52. Therefore, as compared to the conventional apparatuses, the number of parts and space can be reduced. As described above, the seat apparatus 1 of this embodiment can ensure the function of releasing the reclining lock with simple mechanical configuration.

What is claimed is:

1. A seat apparatus comprising:
a reclining device which selectively achieves a locked state in which a seat back for a vehicle seat is locked at a selected tilt angle and a lock-free state in which the seat back is released; and
a power assist mechanism which is coupled to the reclining device through a coupling rod and performs an operation of releasing the seat back of the reclining device and an operation of resetting the seat back from a tilted state to a substantially upright state, wherein the power assist mechanism includes:
a motor which is rotatable in a normal direction and a reverse direction;
seat back-side bracket tiltably provided to move the seat back;
an operational gear which is operationally coupled to the motor and is turnable depending on a rotational direction of the motor;
a rod gear provided integrally with the coupling rod to be turnable with the coupling rod; and
a lever gear having a gear part which can be engaged with the rod gear and an engaging part which can be engaged with the operational gear, the lever gear being turnably provided to transmit the turning of the operational gear to the rod gear,
wherein rotation of the motor in the normal direction causes the operational gear to transmit power from the motor to the seat back-side bracket so as to tilt the seat back-side bracket in the direction of resetting the seat back from the tilted state to the substantially upright state; and
wherein rotation of the motor in the reverse direction causes the lever gear and the rod gear to cooperate to transmit power from the operational gear to the coupling rod so as to turn the coupling rod in the direction of releasing the seat back of the reclining device.

2. The seat apparatus according to claim 1, wherein the operational gear is a sector gear having a small diameter part and a large diameter part; and
wherein a first end of the large diameter part of the sector gear functions as a first pressing part which is arranged to press the seat back-side bracket when the motor is rotated in the normal direction, and a second end of the large diameter part of the sector gear, the second end being opposite the first end, functions as a second pressing part which is arranged to press the engaging part of the lever gear when the motor is rotated in the reverse direction.

3. The seat apparatus according to claim 2, further comprising a control unit arranged to control the power assist mechanism, wherein the control unit includes:
a lock releasing switch;
a state detecting sensor for detecting whether the reclining device is in the locked state or the lock-free state; and
an electronic control unit (ECU) electrically connected to the motor, the lock releasing switch and the state detecting sensor, wherein operation of the lock releasing switch when the reclining device is in the locked state causes the electronic control unit (ECU) to rotate the motor in the reverse direction.

4. The seat apparatus according to claim 1, further comprising a control unit arranged to control the power assist mechanism, wherein the control unit includes:
a lock releasing switch;
a state detecting sensor for detecting whether the reclining device is in the locked state or the lock-free state; and an electronic control unit (ECU) electrically connected to the motor, the lock releasing switch and the state detecting sensor, wherein operation of the lock releasing switch when the reclining device is in the locked state causes the electronic control unit (ECU) to rotate the motor in the reverse direction.

* * * * *